United States Patent [19]

Vicker

[11] 4,421,014

[45] Dec. 20, 1983

[54] BEVERAGE PREPARATION ASSEMBLY

[76] Inventor: Wayne Vicker, 2480 SW. 57th Ter., Hollywood, Fla. 33023

[21] Appl. No.: 441,085

[22] Filed: Jan. 5, 1983

[51] Int. Cl.³ .............................................. A47J 31/00
[52] U.S. Cl. .................................... 99/289 P; 99/295; 99/307
[58] Field of Search ............ 99/289 R, 289 T, 289 D, 99/289 P, 302 R, 302 P, 307, 310, 295, 308, 309

[56] References Cited

U.S. PATENT DOCUMENTS

| | | | |
|---|---|---|---|
| 2,114,063 | 4/1938 | Stoner | 99/307 |
| 3,055,286 | 9/1962 | Valente | 99/302 R |
| 3,232,213 | 2/1966 | Valente | 99/307 |
| 4,253,385 | 3/1981 | Ernesto | 99/295 |

Primary Examiner—Robert W. Jenkins

Attorney, Agent, or Firm—John Cyril Malloy

[57] ABSTRACT

An assembly directed to the preparation or production of individual servings of a predetermined, variable quantity beverage, wherein the assembly is primarily intended for the production of Expresso Coffee or like beverage. The assembly may be manually operated and includes the directing of liquid from a liquid storage facility under pressure to a liquid dispersement receptacle. One or more filter receptacles having the beverage forming ingredient therein are brought into sealing engagement with the liquid receiving receptacle for the purpose of forcing the liquid into direct contact with the beverage ingredients resulting in the formation of the intended beverage and its delivery to a pre-positioned serving receptacle in aligned relation to the subject filter receptacle.

17 Claims, 22 Drawing Figures

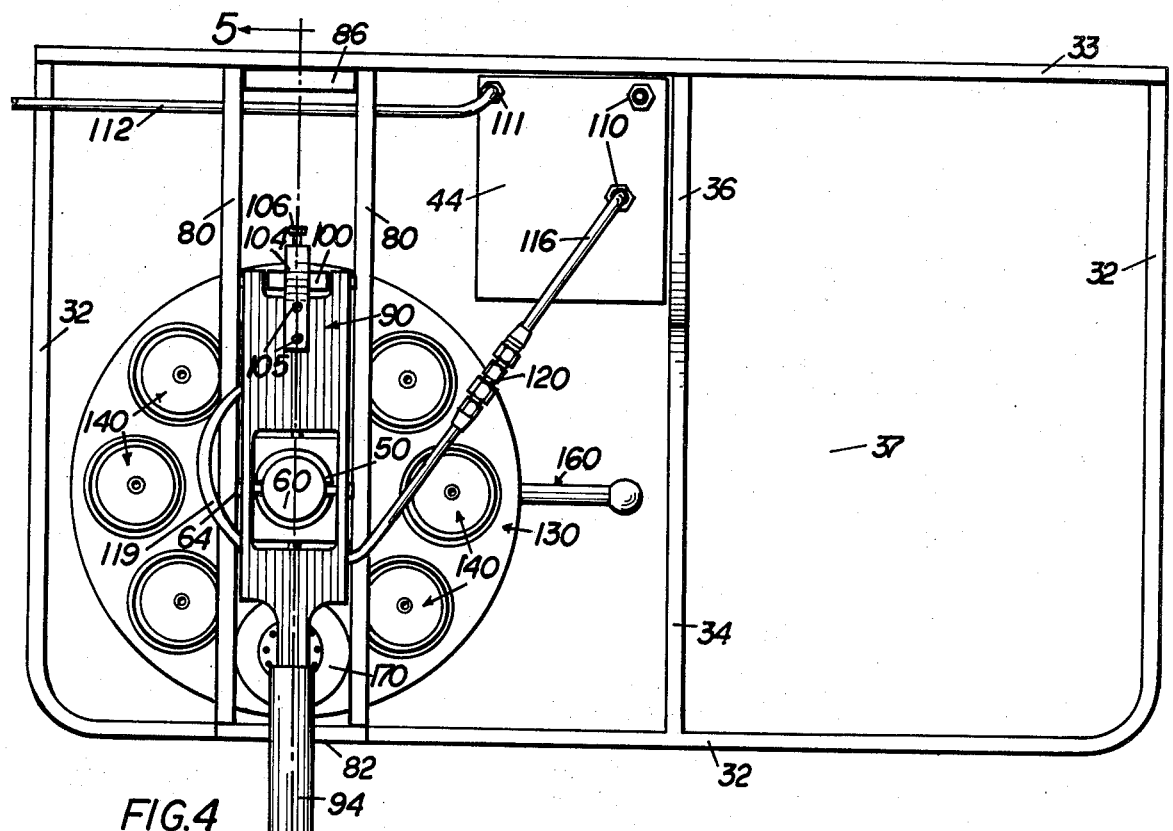

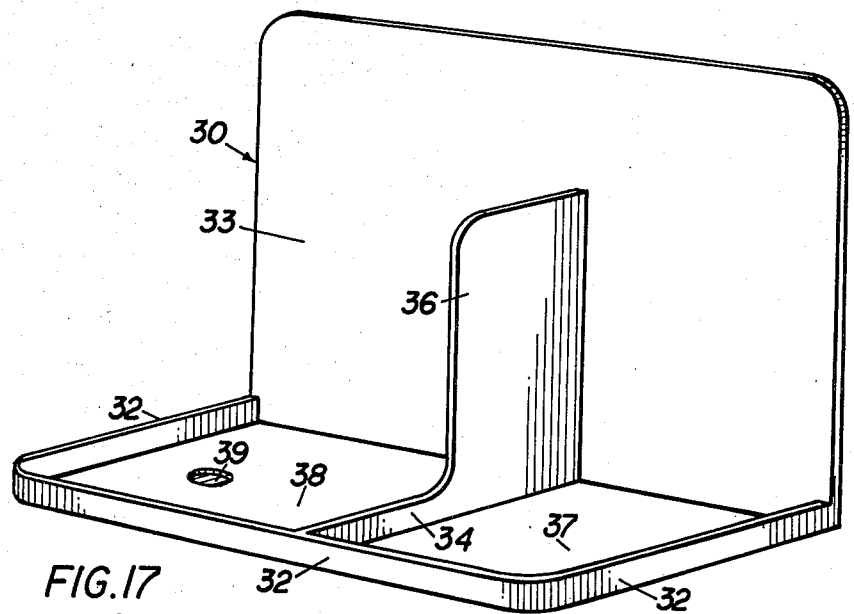
FIG.17
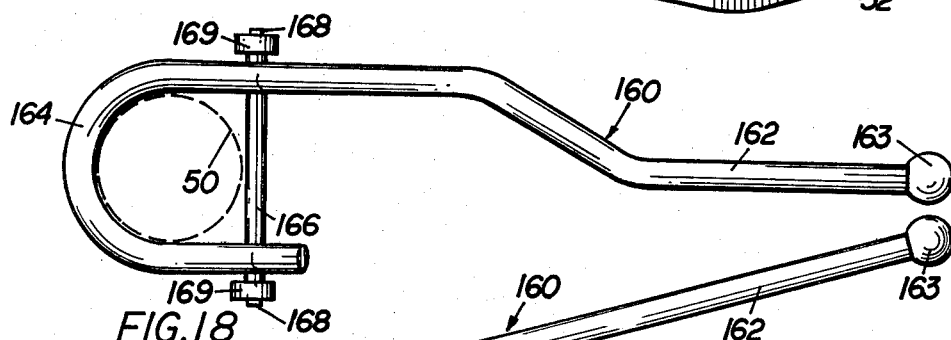
FIG.18
FIG.19
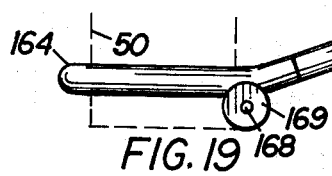
FIG.20 FIG.21 FIG.22

BEVERAGE PREPARATION ASSEMBLY

BACKGROUND OF THE INVENTION

1. Field of the Invention

This invention relates to an assembly or device for the efficient and rapid production of a beverage, primarily of the type known as Expresso Coffee, wherein water or applicable liquid is directed under pressure into contact with the beverage forming ingredient which is in a powder or granulated form for the preparation of the individual serving of the intended beverage.

2. Description of the Prior Art

The popularity and wide acceptance by consumers of Expresso Coffee has been known for many years. Conventionally, Expresso is prepared utilizing relatively expensive and specialized equipment. In addition, it is known that the preparation time is rather lengthy even when producing relatively small quantities of this beverage. The specialized equipment and lengthy preparation time may be generally acceptable for private or in-home consumption of Expresso. However the popularity of this beverage has resulted in an increased demand for Expresso in public facilities such as restaurants or the like.

While Expresso has been prepared and served in restaurants for sometime, the aforementioned problems concerned with the expense of the equipment and the lengthy time of preparation is looked upon as a great inconvenience to operators of a restaurant. In order to facilitate service in such public facilities, it is of course desirable that all ordered foodstuffs including Expresso and like coffee beverages be served to the clientele as soon as possible after ordering. This generally results in the preparation of large batches or quantities of Expresso which is then stored for at least a brief period. Frequently such preparation and storage of relatively larger quantities of this beverage results in waste when sufficient individual servings are not ordered by the clientele. Also, when the proprietor of a restaurant or like public facility prepares the Expresso beverage on an individual basis, there is a disagreeably long amount of time that elapses from the time of ordering to the time of serving.

Accordingly, there is a recognized need in the restaurant and related industries for a device capable of producing individual servings of predetermined and varying quantities of Expresso in a manner which allows the preparation of such beverage in a relatively short period of time. Such an intended device should be structured to produce or prepare an Expresso beverage having the high quality normally associated wth the more specialized, conventional equipment. In addition, such a device should be relatively inexpensive, easy to maintain and operate and include sufficient structural integrity to have a long operable life.

SUMMARY OF THE INVENTION

The present invention is directed towards an assembly primarily designed for the preparation or production of Expresso coffee. More specifically, the assembly comprises a liquid storage facility to which hot water is supplied in a conventional fashion. A fluid inlet delivers the water from the liquid storage facility to a liquid driving means in the form of a pump. The pump is further defined by a piston and cylinder structure wherein the piston is reciprocably mounted within a substantially hollow support element and the accompanying cylinder is defined by the voided volume within the interior of the support element as the piston portion passes from its innermost position to its outermost position during its outward stroke. The positioning of the piston occurs through manipulation of a lever arm arrangement pivotally attached to a support portion of the assembly. The length of the stroke and accordingly the volumetric dimensions of the cylinder is determined by a stop element. Accordingly, the longer the outer stroke of the piston the greater the volume of the cylinder and the more liquid or water is formed from the liquid storage facility into the cylinder.

The downward stroke of the piston forces the water from the cylinder through a water outlet conduit into a water dispersement means. Water or liquid flow from the liquid storage facility to the cylinder and from the cylinder to the liquid dispersement means is accomplished through proper one-way valving positioned both upstream and downstream of the cylinder.

The liquid dispersement means includes a liquid delivery receptable including an apertured base wherein liquid delivered to the interior of this receptable is allowed to pass through the apertures of the base, into individual ones of a plurality of filter receptacles. These plurality of filter receptacles define a filter means and are further structured to have contained therein beverage ingredients in granular or powdered form. More particularly, individual packages of the beverage ingredient may be designed for placement in the individual filter receptacle wherein direct exposure and contact of liquid or water passing from the liquid delivering receptacle causes the formation of the intended beverage, such as Expresso, in a manner which is well known. To accomplish efficient passage of the liquid from the liquid receiving receptacle into the filter receptacle, each of the receptacles are independently positioned into sealing engagement with the undersurface of the liquid receiving receptacle. The apertured base of the liquid receiving receptacle passes substantially into the interior of the filter receptacle thereby delivering water or liquid in the prescribed manner into direct contact with the beverage ingredient mentioned above.

A centrally located aperture in each of the filter receptacles allows passage of the formed beverage therefrom and delivery into a pre-positioned serving receptacle or the like for the collection of the formed beverage and removal thereof from the assembly.

Operation of the pump means including relative reciprocal movement of the piston portion relative to the cylinder may occur manually and either concurrently or subsequent to the positioning of the individual filter receptacles into registered, sealing, liquid receiving relation to the liquid delivery receptacle.

It should be noted that while the subject invention is herein described primarily with reference to the preparation or production of Expresso coffee, the assembly is readily adaptable to the preparation or production of other beverages which are capable of being formed by the mixture of water or applicable liquid to a beverage ingredient wherein the ingredient is provided in a liquid dissolvable form.

BRIEF DESCRIPTION OF THE DRAWINGS

For a fully understanding of the nature of the subject invention, reference should be had to the following detailed description taken in connection with the accompanying drawings, in which:

FIG. 4 is a top plan view of the embodiment of FIG. 3.

FIG. 5 is a sectional view taken along the line 5—5 of FIG. 4.

FIG. 17 is an isometric view of the support base of the present invention.

FIG. 18 is a top plan view of the positioning for the support plate of the present invention.

FIG. 19 is a side view of the embodiment of FIG. 18.

FIG. 20 is an isometric view of the piston portion of the piston and cylinder assembly of the present invention.

FIG. 21 is a sectional view taken along line 21—21 of FIG. 20.

FIG. 22 is a sectional view in partial cutaway showing details of the cylinder portion of the piston and cylinder assembly and the liquid inlet and outlet conduit disposed in communication therewith.

Similar reference characters refer to similar parts throughout the several views of the drawings.

DETAILED DESCRIIPTION OF THE PREFERRED EMBODIMENT

The present invention is directed towards a beverage preparation assembly of the type primarily designed but not necessarily limited to the preparation or production of Expresso Coffee. More specifically, the beverage is prepared in individual quantities where the quantity may be predetermined and varied as will be explained in greater detail hereinafter.

Figures 1, 2:
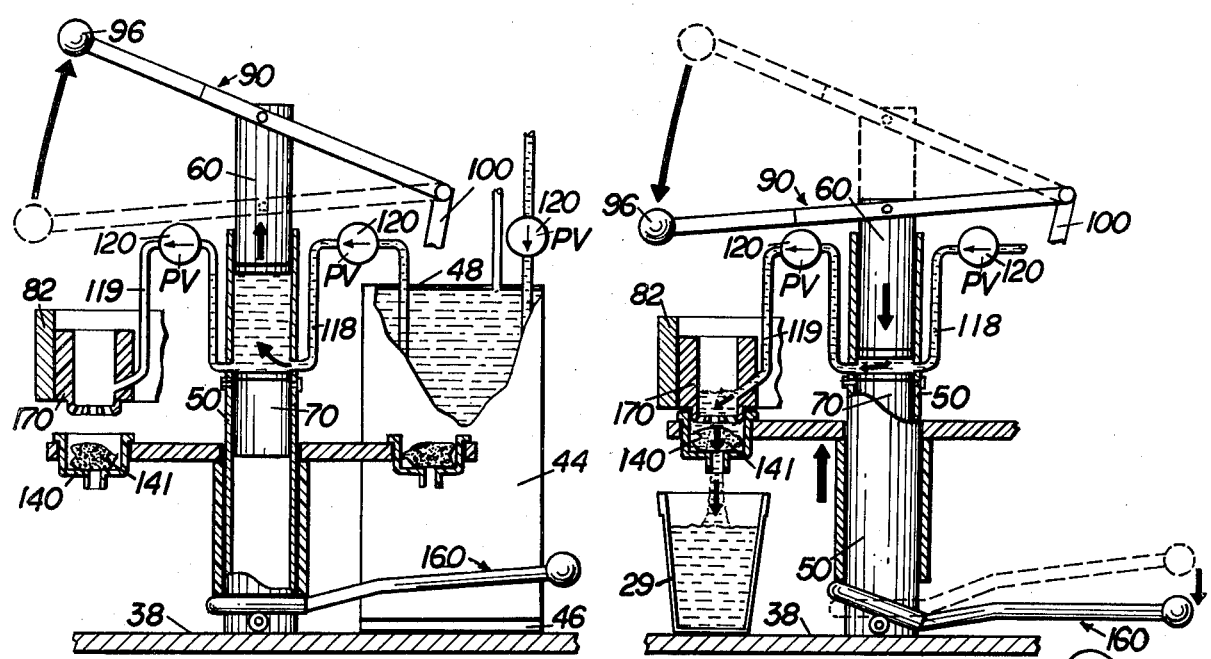
FIG. 1 is a sectional view in partial cutaway of various components of the present invention.
FIG. 2 is a sectional view in partial cutaway showing operation of the various components and delivery of the prepared beverage to a serving receptacle.
Figure 3:
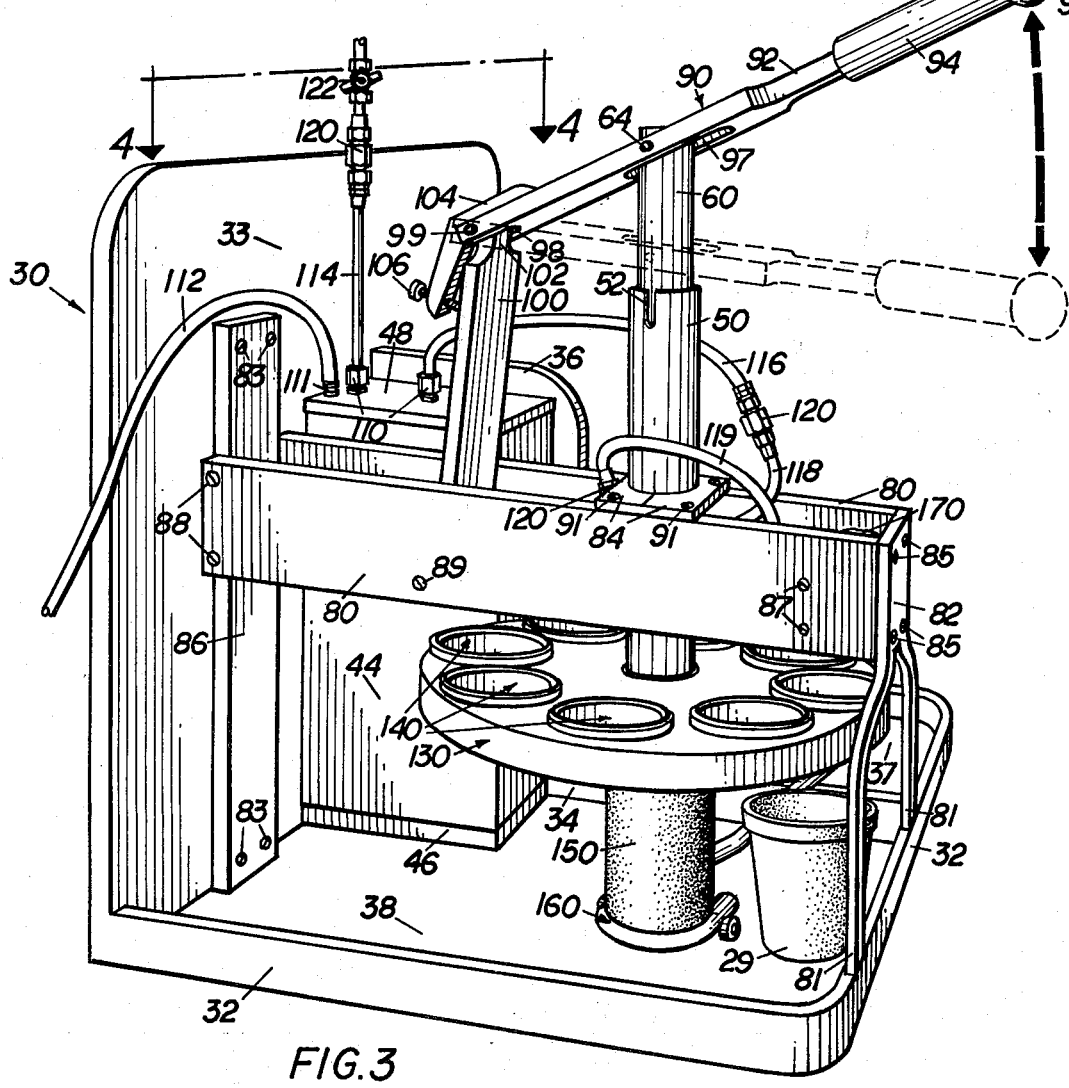
FIG. 3 is an isometric view of the preferred embodiment of the present invention.

FIGS. 1, 2 and 3 show the operation and interrelation of the various structural components of the assembly. With reference to FIG. 17, the components may be supported in or mounted on a base means 30 having support platforms 37 and 38. Platform 38 is used primarily to support and have mounted in the vicinity thereof, the various components of the assembly as pictured in FIGS. 3 and 4. Platform 37 may be used for the storage and/or placement of condiments, serving receptacles, etc. in the general vicinity of the subject beverage preparation assembly. A backwall 33 extends upwardly from one edge of the platforms 37 and 38 wherein the platforms are separated by a first partition 34 and a second partition 36 which has a greater height to accommodate segregation of the liquid storage facility 44. A surrounding rim 32 is integrally formed about the remainder of the boundary of the support base 30. It should be noted that any particular support base including a substantially conventional table surface or the like may be easily modified and utilized to support and/or accommodate the various structural components of the subject assembly.

The assembly comprises a support means including element 50 attached as at 39 to the platform 38 and extending upwardly therefrom as shown in FIGS. 1, 2 and 3.

The support means 50 has a substantially hollow configuration and at least partially defines and accommodates a fluid driving means. This fluid driving means defines a pump means wherein the pump means is in turn defined by a piston and cylinder assembly. Piston portion 60 is reciprocably movable on the interior of the support means 50 at the upper portion thereof as shown in FIGS. 1 and 2. The voided volume of the interior of support means 50 formed when the piston portion 60 travels from its lowermost position to its uppermost position defines the cylinder portion of the piston and cylinder assembly as mentioned above.

As readily seen, reciprocable movement as shown by directional arrows in FIGS. 1 and 2 of the piston 60 causes liquid stored in liquid storage means 44 to be directed or driven through water inlet means 116-118 into the interior of the cylinder located immediately beneath the piston 60 when it is in its uppermost position (FIG. 1). The base or lower boundary of the cylinder is defined by a plug element 70 positioned on the interior of support means 50. This plug element 70 is maintained in proper position by a connecting member 79 secured at the opposite or distal end by conventional screw threaded fasteners 76 and 78. As best shown in FIG. 22, O-ring or seal element 72 defines a water-tight or water-sealing engagement of the plug 70 on the interior of the support means 50 in order to prevent inadvertent liquid escaping from the cylinder. Upon the downward stroke of piston 60 to the position shown in FIG. 2, the water is forced through an outlet means defined by conduits 117 and 119 into a liquid dispersement means 170. The liquid dispersement means comprises a liquid receiving receptacle 170 disposed in direct fluid communication with the interior of the cylinder through the outlet means or fluid conduits 117 and 119. Unidirectional flow is established between liquid storage means 44 and the cylinder portion and between the cylinder portion and the liquid receiving receptacle 170 through the provision of one-way valves 120 located respectively upstream and downstream of the cylinder. Again with reference to FIG. 22, interconnection of the conduits 117 and 118 occur by substantially conventional threaded connectors 180 and 182 connected directly to the support means 50 and establishing fluid communication with the respective conduits as shown.

Operation of the pump means defined by the piston and cylinder assembly may be manually powered through movement of the piston positioning means generally indicated as 90 in the form of a lever arm 92. A handle sleeve 94 is secured to one end which culminates in the nozzle end 96 at the distal end thereof. The piston positioning means 90 is pivotally attached as at 64 to the outermost end of piston 60. A rod or the like 64 extends through channel 62 (FIG. 21) in order to accomplish the relative pivotal movement between the arm 92 and the piston 60. The piston portion 60 is forced between its outermost position (FIG. 1) and its innermost position (FIG. 2), in accordance with the directional arrows, thereby resulting in liquid flow from the liquid storage means 44 to the liquid delivery receptacle 170. With reference to FIG. 3, pivot rod or pin 64 passes into indentation 52 formed in the outermost end of support means 50 in order to accomplish the innermost position of the piston 60.

Support portions comprising parallel braces 80 are attached at one end to the rear support panel 33 of the space means 30 and at the other end to an upwardly extending brace element 82 having spaced apart forked legs 81 resting on the peripheral edge 32 of the base means 30. Conventional connectors 85 serve to secure the parallel braces 80 to the upstanding brace element 82. Similarly, conventional connectors 83 and 88 attach the various braces and support portions 86 and 80 to one another and to the base means 30. Supporting brackets 84 surround an outer peripheral portion of the support means 50 and are secured in supported position to the parallel braces 80 by connectors 91 (FIG. 3). As shown in FIGS. 20 and 21, additional structural features of the piston portion 60 includes annular indentation 68 adapted to have mounted therein an O-ring 69 defining a liquid-type seal between the interior surface portions of the support means 50 and the piston itself. This assures proper liquid flow from the cylinder to the liquid delivery receptacle 170 as set forth above.

A feature of the present invention includes the ability to vary the volume of the cylinder and accordingly the amount of liquid directed from the liquid storage means 44 to the liquid receiving receptacle 170. With primary reference to FIGS. 3, 4 and 5, the variation of such volume is accomplished through the provision of a stop means 104 having its end attached to piston positioning means 90. At this end, the piston positioning means is pivotally and/or hingedly attached to the supporting brace 100 also secured between parallel braces 80 as at 89. Pivotal attachment is accomplished through the insertion of pivot pin 90. The stop means 104 is secured by connecting member 105 directly and fixedly to the piston positioning 90. The opposite end thereof as at 106 includes a selectively positionable stop element 107 which may be threadably attached to the end 106 to eventually be brought into abutting relation with the supporting brace 100. The inward or outward positioning of the stop element 107 relative to the end 106 of course defines the spaced apart distance of stop element 107 from the support brace 100. The abutting engagement between stop element 107 and support brace 100 defines the outermost position of piston 60 and accordingly the volume of the cylinder defined by the voided portion of the interior of support means 50. Regulation of the position of the stop element 107 towards or away from the support brace 100 will determine the outermost position of piston 60 and the overall dimension or volume of the cylinder. This in turn will determine the quantity of liquid passing from the liquid storage means 44 into the cylinder and the resulting quantity of liquid passing into the liquid receiving receptacle 170. The quantity of individual beverage being prepared may therefore be infinitely regulated merely by adjusting the stop element 107 and which determines the outermost position of the piston 60.

Figure 6:
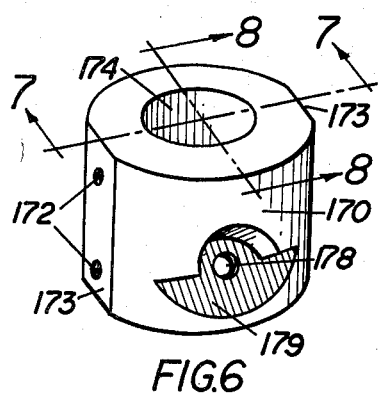
FIG. 6 is an isometric view of the liquid delivery receptacle of the present invention.
Figure 7:
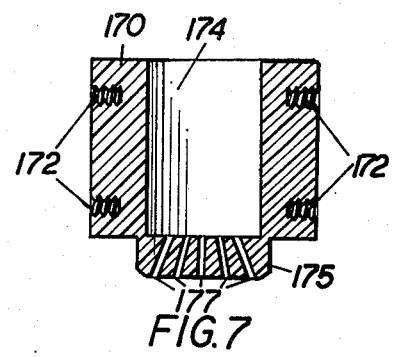
FIG. 7 is a sectional view taken along the line 7—7 of FIG. 6.
Figure 8:
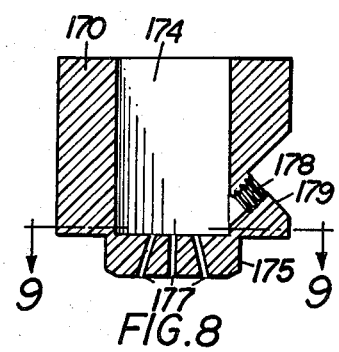
FIG. 8 is a sectional view taken along the line 8—8 of FIG. 6.

Referring to FIGS. 6, 7, 8 and 9, structural details of the liquid delivery receptacle 170 include flats 173 configured for interconnection to parallel braces 80 by conventional fasteners 87 extending through apertures 172. The interior of the receptacle 170 is of course hollow as at 174 to receive the liquid from conduit 119 through threaded aperture connection 178. An angled connecting zone 179 is provided to readily adapt to the reception of the inlet 119 and provide an angled entrance for the incoming liquid as best shown in FIGS. 6 and 8.

Figure 9:
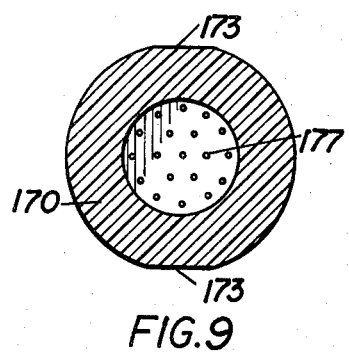
FIG. 9 is a sectional view taken along the line 9—9 of FIG. 8.

The receptacle 170 further includes a base portion 175 configured to extend downwardly from the remainder of the receptacle 170. Further, aperture means are integrally formed in the base 175 wherein the plurality of apertures 177 are evenly dispersed to form a substantially even array over the area of the base as best shown in FIG. 9. As liquid passes in through entrance 178, the hollow interior 174 will be at least partially filled and, the water will be forced to evenly pass and be dispersed through the various apertures 177 in base 175. The evenly dispersed array of apertures 177 in base 175 allows water to be evenly distributed as it passes into the interior of the filter receptacle.

Figure 10:
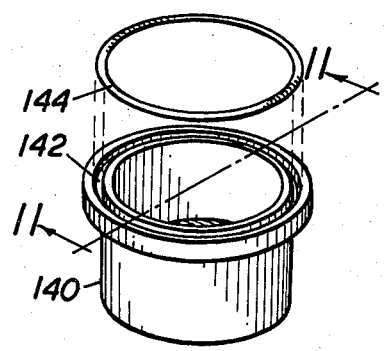
FIG. 10 is an isometric view of the filter receptacle of the present invention.
Figure 11:
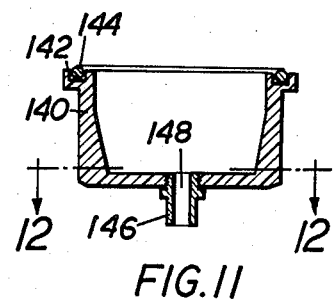
FIG. 11 is a sectional view taken along the line 11—11 of FIG. 10.
Figure 12:
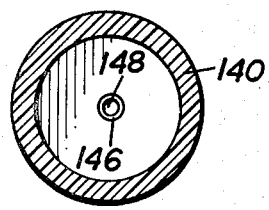
FIG. 12 is a sectional view taken along the line 12—12 of FIG. 11.

The filter means in the present embodiment comprises a plurality of filter receptacles 140 (FIGS. 10, 11 and 12) structured and adapted to have contained therein a beverage ingredient preferably in the form of a unitary package 141 (FIG. 1). More specifically, the filter receptacle 140 includes a sealing element in the form of an O-ring 144 mounted in the annular channel 142 about the upper periphery of the filter receptacle 140. The base element 175 of the liquid receiving receptacle 170 is specifically dimensioned to extend down into at least a portion of the interior of the filter receptacle 140. Accordingly, the upper peripheral portion including the area contiguous the seal 144 is brought into engagement with the undersurface of the liquid receiving receptacle 170 thereby forming a registered, aligned liquid-tight sealing engagement therewith. (See FIG. 2). The above-noted engagement and aligned registry of filter receptacle 140 with liquid delivery receptacle 170 assures water coming into exposed and direct contact with the beverage ingredient 141. This in turn insures proper mixture and formation of the intended beverage. The filter receptacle 140 as a single substantially centrally located exit nozzle 146 communicating as at 148 with the interior of the filter receptacle 140. This allows passage of the formed beverage directly into a serving receptacle 29 properly positioned beneath the filter receptacle 140 as shown in FIGS. 2, 3 and 5.

Figure 13:
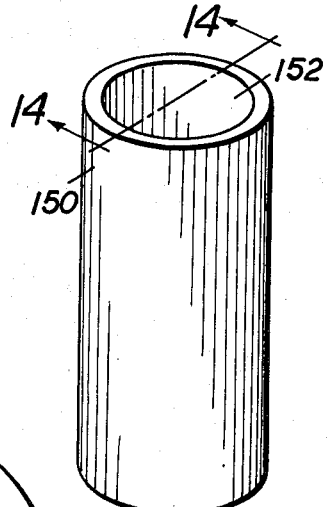
FIG. 13 is an isometric view of a positioning component of the present invention.
Figure 14:
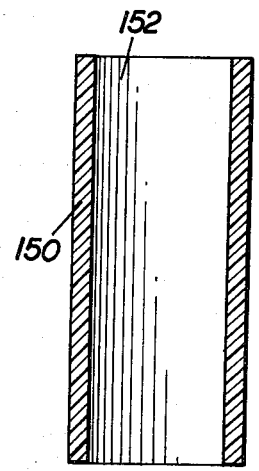
FIG. 14 is a sectional view taken along the line 14—14 of FIG. 13.
Figure 15:
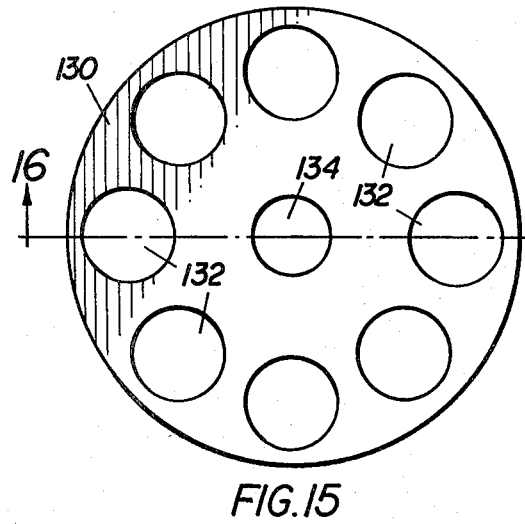
FIG. 15 is a top plan view of the support plate for the filter receptacles of the present invention.
Figure 16:
FIG. 16 is a sectional view taken along the line 16—16 of FIG. 15.

Other structural features of the preferred embodiment include the plurality of filter receptacles 140 mounted about the periphery of a support plate or disc 130. This mounting occurs through the provision of a plurality of spaced apart apertures 132 conforming generally to the size of the filter receptacles 144 for removable mounting the filter receptacles therein. A central aperture 134 is provided for the mounting of the support plate 130 in surrounding relation to the support means 50. Further, in order to consecutively position each of the filter receptacles 140 into registered, aligned liquid-receiving position relative to the liquid receiving receptacle 170, the support plate 130 is rotatably mounted on support means 150 and supported in this position by a positioning sleeve 150. The positioning sleeve 150 (FIGS. 13 and 14) itself is disposed concentrically about the support means 50. This concentric positioning is enhanced by the fact that the sleeve is structured to move vertically along the longitudinal axis over the exterior surface thereof. This vertical movement is accomplished by the manual manipulation of positioning arm 160 (FIGS. 18 and 19). The positioning arm 160 includes shaft portion 162 having its distal end 163 ending in a knob-forming handle.

As best shown in FIG. 2, the downward positioning of arm 160 in accordance with the directional arrow shown causes the upward vertical positioning of the positioning sleeve 150 and the attendant upward movement of support plate 130. This in turn accomplishes the above-mentioned registered sealing liquid-receiving positioning of the filter receptacle 140 with the liquid-receiving receptacle 107 (FIG. 2). As shown in FIGS. 2, 18 and 19, the downward movement of the handle or knob portion 163 is accomplished through the provision of a pivot shaft 168 within connecting sleeve 166 supported at opposite ends by roller elements 169. This structure allows the pivoting action of the arm 160 directly on platform 38 of the base means causing the opposite end as at 164 of the arm to raise the sleeve 150 resting thereon. This upward movement of course causes the upward movement of the support plate 130 and the relative engagement between filter receptacle 140 and liquid-receiving receptacle 170.

In that the support plate 130 is also constructed to rotate about the outer surface of support means 50, each of the consecutively positioned filter receptacles 140 may be successively positioned, as desired, into alignment with the liquid-receiving receptacle 170 for the preparation of individual servings of the beverage in a manner which should now become apparent.

Other structural features of the present invention not heretofore described relate to the liquid storage means. More specifically, a supply conduit 114 (FIG. 3) is connected to proper valving 120 and a flow regulator 122 to conventional water supply such as a hotwater heater or the like. Entrance of hot liquid or water through conduit 114 occurs as at 110 wherein the conduit connections 110 further serve to interconnect inlet conduit 116 leading to conduit 118 and to the cylinder or interior of support means 50. Further, a drain conduit 112 is provided and connected to the interior of the liquid storage means as at 111. This provides for any run-off or needed emptying of the liquid storage means in situations where the entire unit must be cleaned or the water or liquid contained therein is not of sufficient temperature. Finally, access and/or support of the liquid storage means 44 is provided by a top portion 48 and a bottom support portion 46 respectively. (FIG. 1).

What is claimed is:

1. A beverage preparation assembly of the type primarily designed to individually produce beverage servings of predetermined quantity, said assembly comprising:

base means disposed in supporting relation to a remaining portion of said assembly, liquid storage means disposed for liquid delivery to other portions of said assembly, liquid dispersement means disposed in fluid communication with said liquid storage means, liquid driving means mounted on said base means in fluid communication between said liquid storage means and said liquid dispersement means and structured to force a predetermined quantity of liquid from said liquid storage means to said liquid dispersion means, filter means structured for holding beverage ingredients therein and disposed for liquid delivery to a predetermined position container wherein such filter means comprises a support plate and a plurality of filter receptacles mounted thereon in spaced apart relation to one another substantially about the periphery thereof, said support plate movably mounted on said base means and positionable rotatably for alignment of successive filter receptacles with said liquid dispersion means and further positionable axially along the rotational axis of said support plate into sealing engagement between an aligned filter receptacle and said liquid dispersion means, whereby an individual quantity of beverage is formed by filtering separate liquid quantities through beverage ingredients maintained in separate filter receptacles.

2. A beverage preparation assembly as in claim 1 further comprising a support means mounted on said base means and structured and disposed for supporting engagement with the remaining components of said assembly, said support means comprising at least a partially hollow interior defining therein at least a portion of said liquid driving means.

3. A beverage preparation assembly as in claim 2 wherein said liquid driving means comprises a pump means defined at least in part by a piston and cylinder assembly, said piston portion thereof reciprocably movable on the interior of said support means between an outermost and an innermost position, said cylinder portion defined by devoided volume of the interior of said support means left by said piston portion when positioned between said innermost and outermost position.

4. A beverage preparation assembly as in claim 3 wherein said cylinder portion is further defined by a base member fixedly secured within said support means in liquid sealing engagement therewith and disposable to define the bottom-most boundary of said cylinder portion.

5. A beverage preparation assembly as in claim 3 further comprising piston positioning means connected to said piston portion, whereby movement thereof causes reciprocation of said piston portion within said support means; seal means disposed in movable substantially liquid-type sealing engagement with interior surfaces of said support means.

6. A beverage preparation assembly as in claim 5 wherein said piston positioning means comprises a lever arm pivotally connected to said piston portion and pivotally attached to a support portion of said assembly a spaced apart distance from said piston portion, stop means attached to said lever arm and selectively positionable a predetermined distance from said support portion for eventual abutting engagement therewith when said piston portion is in its outermost position, whereby the outermost position of said piston portion and the volumetric size of said cylinder portion is determined by the predetermined position of said stop means relative to said support portion when not in abutting engagement therewith.

7. A beverage preparation assembly as in claim 1 further comprising a fluid inlet means connected to establish fluid flow between said liquid storage means and said liquid driving means; a fluid outlet means connected to establish fluid flow between said liquid driving means and said liquid delivery means, a valve means connected in fluid regulating position to said fluid inlet means and said fluid outlet means, said valve means structured to allow fluid flow in a single direction therethrough, whereby activation of said fluid driving means causes liquid flow successively from said liquid storage means to said liquid driving means and from said liquid driving means to said liquid dispersement means respectively.

8. A beverage preparation assembly as in claim 1 wherein said liquid dispersement means comprises a liquid receiving receptacle interconnected in fluid receiving relation to and downstream of said liquid driving means and further including a base portion at least partially defining a lower boundary of said liquid receiving receptacle, said base portion structured for the passage of liquid therethrough, whereby said liquid receiving receptacle is emptied at least partially due to gravity through said base portion.

9. A beverage preparation assembly as in claim 8 wherein said base portion comprises aperture means integrally formed therein, said aperture means comprising a plurality of apertures disposed in spaced apart relation to one another to define an evenly disposed array of apertures over at least a major portion of said base, whereby liquid is delivered from said base portion substantially evenly over the external surface thereof.

10. A beverage preparation assembly as in claim 8 wherein said base portion protrudes downwardly a spaced distance from the remainder of said liquid receiving receptacle, said base element having a peripheral boundary less than the internal dimension of said filter means for at least partially fitting therein, whereby water is delivered directly through said base element from said liquid receiving receptacle into the interior of said filter means.

11. A beverage preparation assembly as in claim 1 wherein said filter means comprises each of said filter receptacles comprising a liquid seal element disposed about the upper peripheral portion thereof, each of said receptacles positionable into aligned, sealing engagement with an undersurface portion of said liquid dispersement means said liquid seal element configured and positioned for substantially surrounding disposition of said base portion upon protrusion of said base element into the interior of each of said filter receptacles and delivery of liquid therein.

12. A beverage preparation assembly of the type primarily designed to individually produce beverage servings of predetermined quantity, said assembly comprising:
a. base means disposed in supporting relation to a remaining portion of said assembly,
b. liquid storage means disposed for liquid delivery to other portions of said assembly,
c. liquid dispersement means disposed in fluid communication with said liquid storage means,
d. liquid driving means mounted on said base means in fluid communication between said liquid storage means and said liquid dispersement means and structured to force a predetermined quantity of liquid from said liquid storage means to said liquid dispersement means,
e. filter means disposable in registered fluid receiving position relative to said liquid dispersement means,
f. said liquid delivery means comprising a pump means defined at least in part by a piston and a cylinder assembly, said piston portion reciprocably movable between an outermost end and an innermost position relative to said cylinder,
g. piston positioning means comprising a lever arm pivotally connected to said piston portion and pivotally attached to said base means a spaced apart distance from said piston portion,
h. stop means attached to said lever arm and selectively positionable in a predetermined distance from said support portion for eventual abutting engagement therewith when said piston portion is in its outermost position, whereby the outermost position of said piston portion and the volumetric size of said cylinder portion is determined by the predetermined position of said stop means relative to said support portion when not in abutting engagement therewith;
i. said filter means structured for holding beverage ingredients therein and disposed for liquid delivery to a prepositioned container, whereby an individual quantity of beverage is formed by filtering separate liquid quantities through beverage ingredients.

13. A beverage preparation assembly as in claim 12 wherein said filter means comprises at least one filter receptacle comprising a liquid seal element disposed about the upper peripheral portion thereof, said one filter receptacle positionable into aligned, sealing engagement with an undersurface portion of said liquid dispersement means, said liquid seal element configured and positioned for substantially surrounding disposition of said base portion upon protrusion of said base element into the interior of said filter element and delivery of liquid therein.

14. A beverage preparation assembly as in claim 13 wherein said filter means comprises a plurality of said filter receptacles each mounted in spaced apart relation to one another and independently positionable in registered sealing engagement with said liquid delivery receptacle for receiving liquid therefrom.

15. A beverage preparation assembly as in claim 14 further comprising a support plate disposed in spaced relation from said liquid dispersement means and movably mounted relative to the position of said liquid receiving receptacle, said plurality of filter receptacles mounted in spaced relation to one another about the outer periphery of said support plate, said support plate positionable to accomplish registered, sealed engagement between said liquid receiving receptacle and each of said filter receptacles independently of one another.

16. A beverage preparation assembly as in claim 12 wherein said filter means comprises at least one filter receptacle spaced apart from said liquid dispersement means and positionable into registered engagement therewith, said registered engagement disposing said filter receptacle in aligned liquid receiving position relative to said liquid dispersement means, whereby liquid is passed from said liquid dispersement means into said filter receptacle and exposure to beverage ingredients disposed therein.

17. A beverage preparation assembly as in claim 16 wherein said filter means comprises at least one filter receptacle spaced apart from said liquid receiving receptacle and positionable into registered, water-receiving relation to said liquid receiving receptacle, said registered relation at least partially defined by sealed engagement between the upper peripheral portion of said filter receptacle and an undersurface portion of said liquid receiving receptacle.

* * * * *